United States Patent [19]
Riethmuller et al.

[11] 3,828,259
[45] Aug. 6, 1974

[54] PEAK DETECTOR

[75] Inventors: Lothar H. Riethmuller, Oberuhldingen; Richard Sponholz, Mulhofen; Hans Kiefer; Ernst Spreitzhofer, both of Nubdorf, all of Germany

[73] Assignee: Bodenseewerk Perkin-Elmer & Co., GmbH, Uberlingen/Bodensee, Germany

[22] Filed: Feb. 7, 1973

[21] Appl. No.: 330,242

[30] Foreign Application Priority Data
Feb. 17, 1972 Germany.......................... 2207315

[52] U.S. Cl.............. 328/151, 307/229, 307/235 A, 307/261, 328/128, 328/146
[51] Int. Cl....................... H03k 5/153, H03k 17/30
[58] Field of Search............ 307/229, 235 R, 235 A, 307/261; 328/128, 132, 146, 147, 148, 149, 150, 151, 162

[56] References Cited
UNITED STATES PATENTS

| | | | |
|---|---|---|---|
| 3,214,700 | 10/1965 | Hook | 328/148 X |
| 3,284,716 | 11/1966 | Chopin | 307/235 X |
| 3,395,355 | 7/1968 | Gabor | 328/146 X |
| 3,634,770 | 1/1972 | Spreitzhofer | 307/235 A |
| 3,691,466 | 9/1972 | Wachs | 328/162 X |
| 3,701,029 | 10/1972 | Hogg | 328/148 X |
| 3,701,954 | 10/1972 | Seminatore et al. | 307/235 X |
| 3,727,143 | 4/1973 | Garrett | 307/235 X |

OTHER PUBLICATIONS
DelToro & Parker, Principles of Control Systems Engineering, p. 546–551; McGraw-Hill, Inc., 1960.
Dalkiewicz et al., "Intersecting Waveforms Trigger Peak Detector," Electronics (publication), May 1, 1967, p. 69–70.

Primary Examiner—Rudolph V. Rolinec
Assistant Examiner—L. N. Anagnos
Attorney, Agent, or Firm—Daniel R. Levinson

[57] ABSTRACT

A known peak detector for detection of peaks in an input signal includes a signal integrator for integrating the signal change over successive short measuring intervals which integrator is reset to zero at the end of each interval and also includes a comparator for comparing the integrator output with a reference quantity. In the disclosed device the reference quantity rises with time in each of the measuring intervals. Since the contribution of a base line shift yields a linearly rising integrator output, the comparator is therefore less sensitive to such base line shifts. Preferably the reference quantity starts at a non-zero constant level and then rises linearly during the later portion of the measuring interval. The comparators therefore do not mistake either noise (which is typically in the form of very short fluctuations so as to yield a sudden moderate plateau in the integrator output) or base line drift (which causes a linearly rising integrator output) for a true peak in the input signal, since the integral of the beginning of a true peak having constantly increasing slope will be a quadratically rising signal (so that it crosses the reference quantity straight line signal before the end of the measuring interval).

8 Claims, 7 Drawing Figures

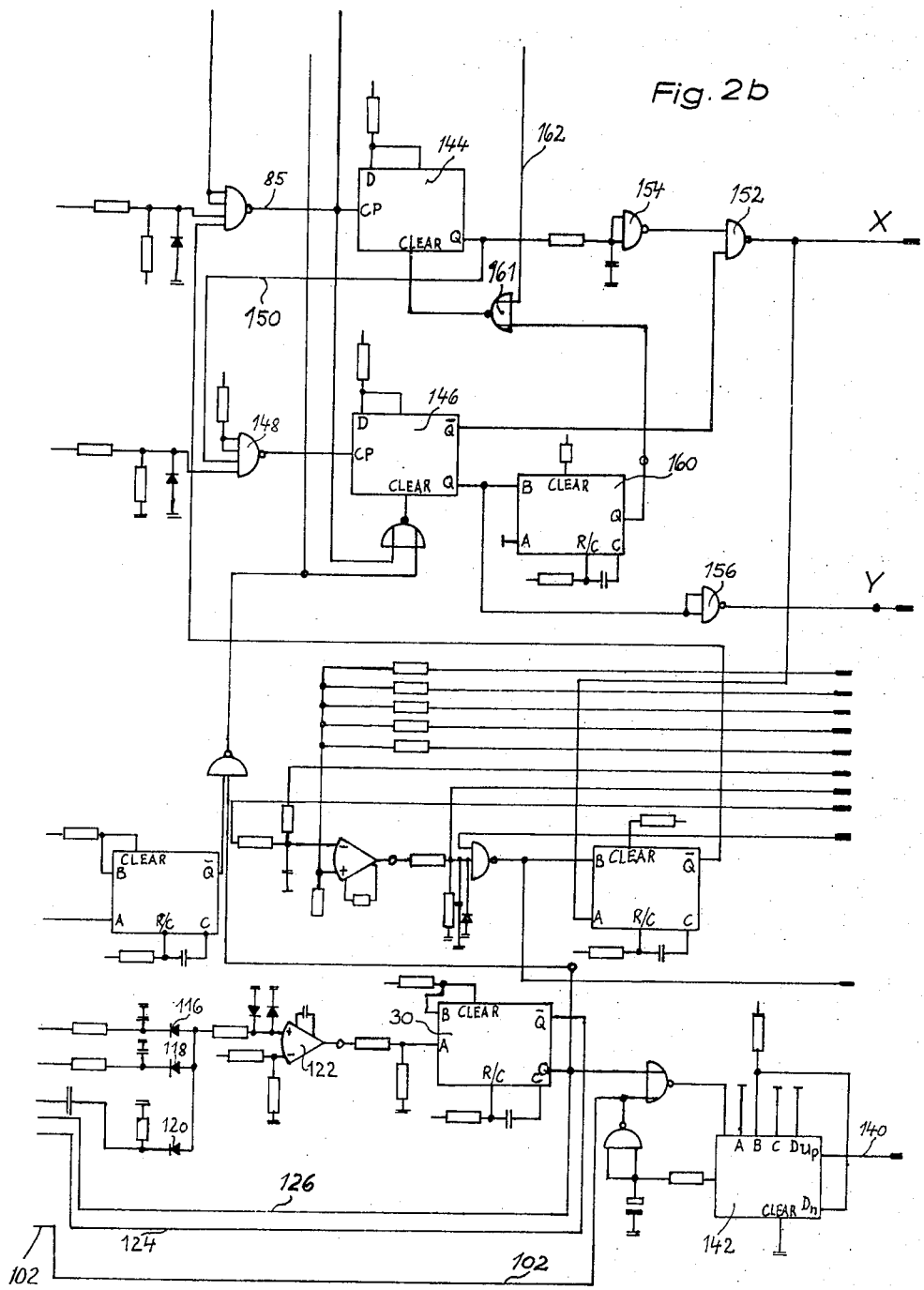

PEAK DETECTOR

This invention relates to a peak detector for the detection of peaks in an input signal, particularly of the type comprising a signal integrator which integrates the signal change over successive short measuring intervals and is automatically resettable to zero at the end of each interval, and further comprising a comparator for comparing the integrator output with a reference quantity, said comparator therefore having applied thereto the output of the signal integrator.

In German published Patent Application No. 1,903,698 corresponding to U.S. Pat. No. 3,634,770, a circuit arrangement responding to the rise of a signal is disclosed, in which the input signal is applied to a Miller-integrator via a summing amplifier. The output of the Miller-integrator is applied to two threshold trigger stages which supply an "1" signal at the output when a pre-established positive or negative, respectively, threshold value at the input is exceeded. Each of these outputs are connected with one input of a respective AND-element, while a clock connects to the other inputs of the two AND-elements. The outputs of the two AND-elements connect to one input of a respective further AND-element. To the second inputs of the latter AND-elements a pulse generator is connected which supplies pulses of a fixed frequency. The outputs of the latter AND-elements are connected with the up and down input, respectively, of a counter. The outputs of the individual counter stages control a digital-to-analog converter whose output (analog) signal is connected in opposition to the original input signal at the input of the summing amplifier. Moreover, the output of the Miller-integrator is applied to two threshold value switches which switch at pre-established positive and negative, respectively, signal amplitudes at the output of the Miller-integrator. The threshold value switches control an analyzer logic circuit which signals the beginning of a peak (as well as other conditions of the input signal). This prior art arrangement operates in a manner such that at the end of each measuring interval upon drifting of the zero line as determined by the first-mentioned threshold trigger stages, the application of the pulse generator to the up or down input of the counter is released (as controlled by the clock intervals) and in this manner the input signal at the amplifier is balanced to zero. During the next following measuring interval, the Miller-integrator therefore receives and integrates only the deviation of the input signal from this last balanced value. If this integral value exceeds a pre-established threshold value which is determined by the second threshold value switches (and whether that is towards the positive or towards the negative), then the respective threshold value switch responds and the analyzer logic circuit generates appropriate control signals, for instance, for switching on a main signal integrator (which therefore integrates the peak relative to its compensated or correct base line).

Since it is not the signal that is differentiated, but rather the integral of the signal change during a fixed measuring interval is determined, the influence of stray peaks (noise) which may be superimposed on the measuring signal, is suppressed. Such stray peaks could, for instance, simulate a peak beginning if differentiation of the input signal were used as the criterion as to whether a peak has begun or not.

The prior art peak detector operates with a fixed threshold value, and therefore does not solve the following problem: A small zero line drift, thus a small input voltage at the input of the integrator leads to a linearly rising output signal at the signal integrator. This linearly rising output signal then can reach the threshold value during a measuring interval and therewith signal a peak beginning, although actually there is no signal rise of the type caused by a peak in the input signal, thus no actual change with time of the input signal. This can be prevented by raising the threshold value, but then the sensitivity of the peak detector is reduced. Also a reduction in the sensitivity of the peak detector would occur with a reduction in the length of the measuring interval. Moreover by a decrease of the threshold value or a reduction in the measuring interval, the influence of stray peaks (noise) and thus the danger of a mistaken operation would again be increased.

It is an object of this invention to so design a peak detector of the type indicated hereinbefore such that on the one hand, small input signal shifts which do not change with time (i.e. base line drifts) do not lead to response of the peak detector, while on the other hand, a high sensitivity for actual signal rises and relative insensitivity to stray short peaks (noise) contained in the input signal are ensured.

According to the invention this object is solved by providing that the reference quantity (to which the integrated change in the input signal is compared) rises with time in each measuring interval.

In this manner a relatively large measuring interval can be utilized. A constant input signal change (i.e. base line movement) at the signal integrator leads to a linearly rising output, and the rise of the reference quantity in each scanning interval can be selected such that for the maximum admissible zero line drift the output of the signal integrator does not reach the rising reference quantity within a measuring interval. With an input signal rise caused by the presence of an actual peak in the signal and thus a change with time of the input signal, the integration causes a quadratic type rise of the integrator output with time. As the scanning interval can be selected relatively large even for small slopes of the input signal waveform (i.e., gradually increasing peaks), the reference quantity is reached by the output of the signal integrator and peak beginning is correctly signalled.

The reference quantity, thus the threshold value at which the peak detector responds, can rise linearly with time. If the quantity were a linear rise from zero, however, there would be the danger that when stray peaks (noise) occur at the beginning of a measuring interval, thus, when the threshold value is still very low, the output of the signal integrator would exceed the reference quantity. This applies in particular to strictly analog operating peak detectors. Therefore, it is advantageous if during an initial portion of each measuring interval the reference quantity maintains a constant finite value and only rises thereafter, the rise of the reference quantity preferably taking place linearly after a constant initial portion.

In the aforesaid prior art peak detector a zero line balancing or compensation is effected at the input of the signal integrator at the beginning of each scanning interval. This arrangement is relatively expensive. A signal waveform which responds to the change of the input signal in each measuring interval can be obtained in a simple manner in that the signal is applied to the signal integrator via a differentiating element and a succeeding integrating element, and the integrating element and the signal integrator are resettable to zero at the beginning of each measuring interval. By the differentiation and subsequent integration (by the integrating element) the form of the signal waveform is maintained. By resetting the integrating element to zero at the beginning of each measuring interval, however, the absolute value of the input signal at the beginning of each measuring interval is suppressed so that the input signal at the signal integrator at the beginning of each measuring interval starts from zero.

For generating an analog reference signal a Miller-integrator can be provided in which the output of an amplifier of high gain is fed back to the input via an (ohmic) resistor and a capacitor. A constant voltage is applied to the input of the amplifier. The capacitor can be shunted by a circuit element controlled by a monostable flip-flop during the initial portion of each measuring interval. In this manner, the constant voltage applied to the Miller-integrator is amplified proportionally during the initial portion of each measuring interval (with shunted capacitor). The gain can be selected appropriately by the selection of the ohmic resistor, so that a desired constant reference signal is obtained. When the monostable flip-flop changes back, shunting of the capacitor by the circuit element is interrupted so that now the integrating effect of the Miller-integrator becomes effective and the capacitor is charged linearly. Thus, the output signal of the (reference) Miller-integrator is constant during the initial portion of each measuring interval and then rises linearly.

To determine the length of the measuring intervals, a counter can be provided to which are supplied counting pulses at a fixed frequency by a pulse generator, and which counter energizes a second monostable flip-flop after a given pulse number, which in turn energizes the monostable flip-flop for the control of the circuit element in the reference signal generator and on the other hand resets the integrating element and the signal integrator as well as the counter to zero. The second monostable flip-flop can be energized via an OR-connection by an output from either one of the comparators in addition to by the counter output.

If no measuring signal rise occurs, the full measuring interval (determined by the counter) is then utilized in this manner. Only at the end of this full interval is the signal integrator reset to zero and a new scanning cycle is initiated (by the counter also being set to zero). If, however, an input signal rise occurs before the ending of the normal measuring interval, to cause the signal integrator output to exceed the reference signal, then the resetting is effected by the comparator output and a new scanning cycle is initiated.

In order both to determine both rise and drop of the input signal and to cause suitable control signals from an analyzer logic circuit, provision can be made that a first and a second comparator are provided, each of which is constituted by a difference amplifier including an inverting and a non-inverting input and a feedback branch from the output to the non-inverting input including in series an ohmic resistor and a diode in blocking direction, and at the first comparator the integrator output connects to the inverting input and an analog reference signal is applied to the non-inverting input, and at the second comparator the integrator output connects to the non-inverting input and the reference signal is inverted and then applied to the inverting input of the comparator.

The invention can also be realized with digitally operating components, and then the signal integrator includes a voltage-to-frequency converter having a first counter to which the output pulses thereof are applied, the reference quantity is the counter reading of a second counter into which a fixed frequency is counted by a pulse generator (thus obtaining a linearly rising count), and the comparator compares the counter reading of the first and of the second counter digitally.

Two illustrative embodiments of this invention will now be described more fully with reference to the accompanying drawings in which.

Figure 1:
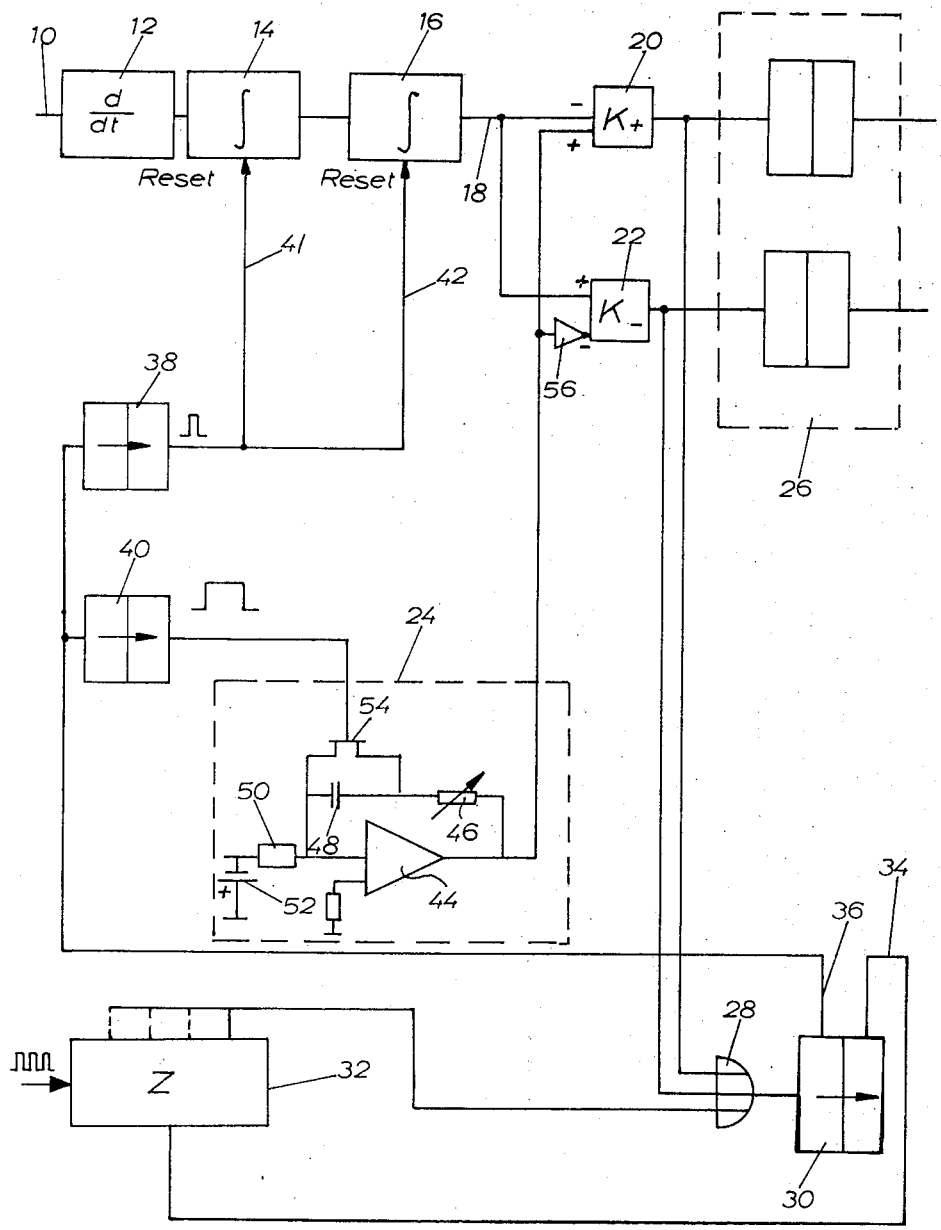
FIG. 1 illustrates very schematically the design of an analog operating peak detector incorporating the invention.

The input signal in FIG. 1 is applied to a terminal 10 and is differentiated by means of a differentiating element 12. The differentiated input signal is then integrated again by means of an integrating element 14. The signal, thus differentiated and integrated the signal waveform of which again corresponds to the signal waveform of the original input signal applied at 10, is supplied to the signal integrator 16. The integrated signal which appears at the output 18 of the signal integrator, is applied to one input each of a comparator 20 and 22, respectively. In the comparators 20 and 22 the input signal is compared with a reference signal which is generated by a reference signal generator 24. The outputs of the comparators 20 and 22 respectively connect to an analyzer logic circuit 26 which generates appropriate control signals, for instance, switches a peak integrator on and off and causes printing of the integral values, retention times in a gas chromatograph, etc. Moreover, the outputs of the comparators 20, 22 energize a monostable flip-flop 30 via an OR-element 28. The monostable flip-flop 30 is also energizable by an output of a counter 32 via another input of the OR-element 28. The monostable flip-flop 30 resets the counter 32 to zero via an output 34. Via the other output 36 of the monostable flip-flop 30 two monostable flip-flops 38, 40 are energized. Via lines 41 and 42 the monostable flip-flop 38 resets respectively the integrating element 14, and the signal integrator 16 to zero. The second monostable flip-flop 40 determines te initial portion of the measuring interval in which the reference signal shall assume a constant value.

The reference signal generator 24 includes a Miller-integrator, i.e., a high-gain amplifier 44 with a feedback loop having in series an ohmic resistor 46 and a capacitor 48. A constant voltage from a voltage source 52 is applied to the input of the amplifier 44 via an ohmic resistor 50. The capacitor 48 can be bridged by a field effect transistor 54 which is controlled by the monostable flip-flop 40.

The described arrangement operates as follows: The counter 32 obtains pulses at a fixed frequency and determines the normal measuring interval. The length of the interval can be varied by alternate connection of the output of one of the other counter stages of the counter 32 to the OR-gate 28, as is indicated in dotted lines in FIG. 1. If there is no signal rise, at the end of a measuring interval the monostable flip-flop 30 will be energized by a pulse from counter 32 via the OR-element 28, whereby the counter is reset to zero, thus starting counting anew. Via lead 36 the monostable flip-flops 38 and 40 are energized. The monostable flip-flop resets the integrating element 14 and the signal integrator 16 to zero. By resetting the integrating element 14 to zero a suppression of the absolute value of the measuring signal (at input 10) is effected. The input signal at the signal integrator 16, though having the same signal waveform as the measuring signal, thus starts from zero at the beginning of each measuring interval. Thus, the signal integrator 16 at its input only obtains the signal change in the measuring interval. At the beginning of each measuring interval the signal integrator 16 is also reset to zero. If the measuring signal is a constant small quantity, then at the output of the signal integrator a linear signal rise is obtained. If, however, the measuring signal rises, for instance, linearly in the measuring interval, then at the output of the signal integrator a quadratically rising signal is obtained.

During an initial portion of each measuring interval, when the monostable flip-flop 40 is in a changed state, the capacitor 48 in the reference signal generator 24 is bridged (shunted) by the field effect transistor 54. The reference signal generator 24 acts like a proportional amplifier including an ohmic resistor in the feedback branch and generates a constant output signal. When the monostable flip-flop 40 has been changed back the field effect transistor 54 is blocked effectively putting capacitor 48 back into the feedback path. Now, the reference signal generator 24 acts as integrator. the capacitor 48 is charged, causing a linear rise of the output signal.

Figure 3:
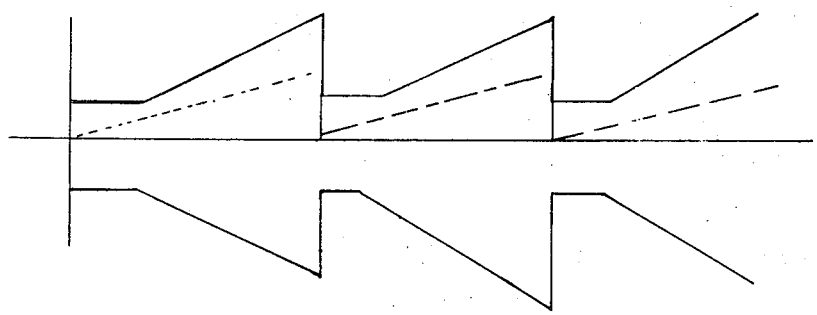
FIG. 3 illustrates the waveform of the reference signal when a small input signal change, constant in time, occurs.
Figure 4:
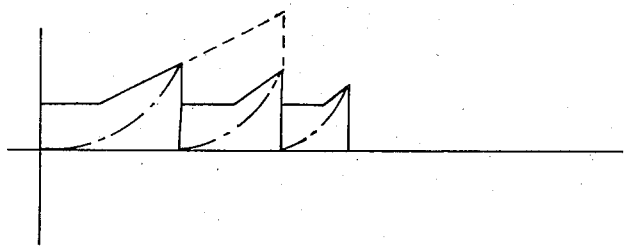
FIG. 4 illustrates the waveform of the reference signal when an input signal rising with time occurs.

As can be seen from FIG. 3, this manner of operation can result in operation such that with a constant non-rising signal at the input 10 the reference signal level (shown in solid lines) is not reached in spite of the linear rise of the integrated signal (shown in broken lines) appearing at the output of the signal integrator 16. If, however, the signal at the input 10 rises, for instance linearly, then the integrated waveform of the signal at the output 18 of the signal integrator 16 becomes quadratic whereby the rising integrator output signal (chain line in FIG. 4) reaches the reference signal (solid line in FIG. 4) and either the comparator 20 or the comparator 22 responds at equality of the signals. If this happens, via the OR-element 28 the monostable flip-flop 30 is also energized, so that the measuring interval is reduced accordingly, as is also illustrated in FIG. 4.

As is obvious from FIG. 1, the integrator output signal is applied to the inverting input of the comparator 20 and the reference signal to the non-inverting input. The integrator output signal is also applied to the non-inverting input of the comparator 22. To the inverting input of the comparator 22 the inverted reference signal is applied via an inverter stage 56. Depending on whether the integrator output signal at the output 18 exceeds the absolute value of the reference signal towards the positive or towards the negative, the comparator 20 or the comparator 22, respectively, responds.

Figure 2A:
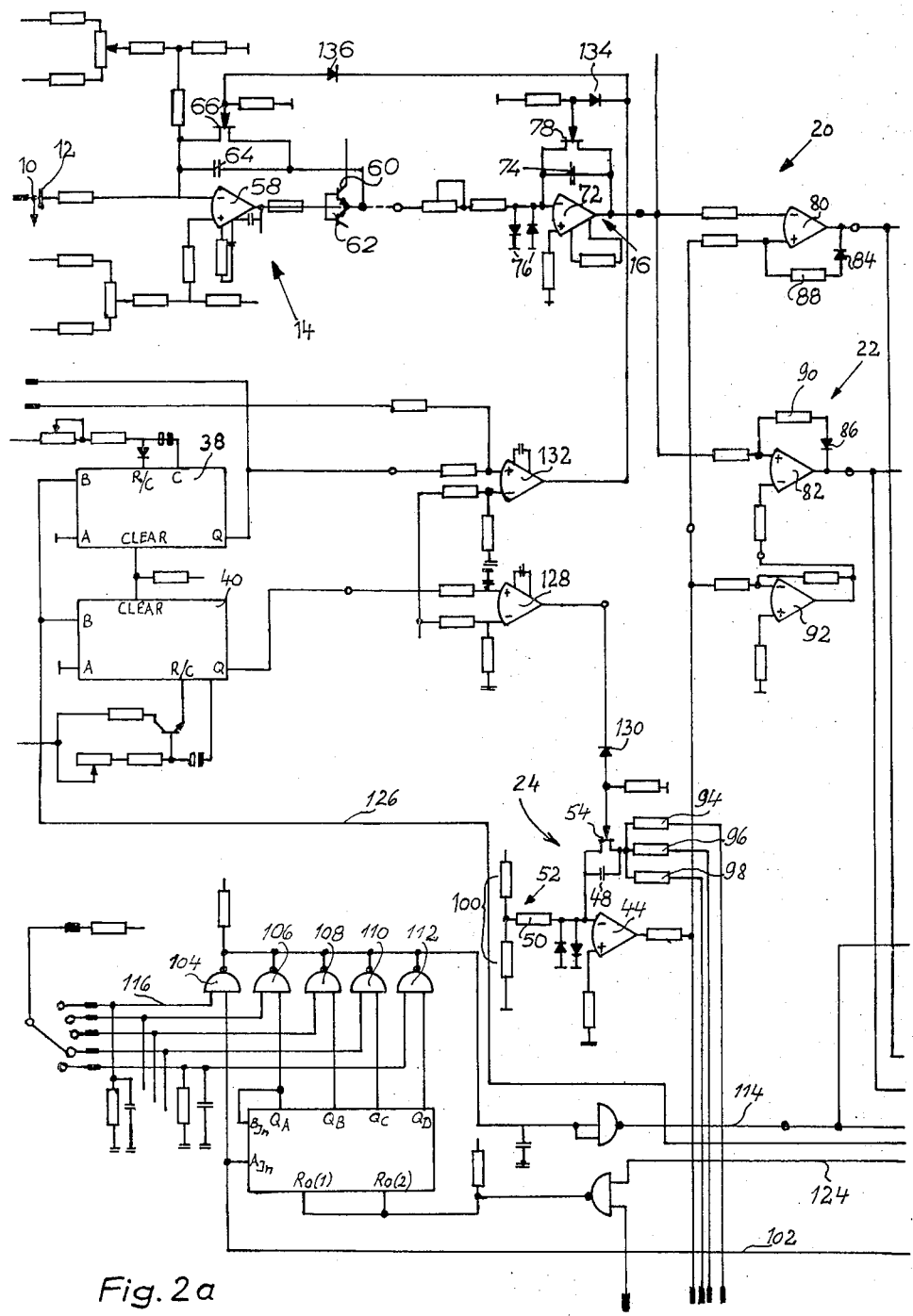
FIG. 2 (a and b) illustrates a detailed circuit diagram of a peak detector according to FIG. 1.

FIG. 2 (a and b) illustrates a detailed circuit diagram of the same peak detector as more diagrammatically shown in FIG. 1. The input signal is applied at point 10 and is differentiated by a differentiating element in the form of the capacitor 12. The succeeding integrating element includes a Miller-integrator with an amplifier 58 whose output controls a pair of complementary transistors 60, 62 for positive or negative signal rise, one of which is driven depending on the differentiated input signal polarity. A capacitor 64 which is bridged by a field effect transistor 66, is connected in the (negative) feedback branch. The differentiated signal is applied to the inverting input of the amplifier 58.

The output signal of the integrator stage 14 is applied to the signal integrator 16 which is also constituted by a Miller-integrator including an amplifier 72 and a capacitor 74. A pair of diodes 76 in parallel but with opposite orientation are also connected to the input of the amplifier 72 for the suppression of stray peaks. The capacitor 74 is bridged by a field effect transistor 78.

The output of the signal integrator 16 is applied to comparators 20 and 22. The comparators 20 and 22 are high-gain differential amplifiers 80 and 82, respectively, with a feedback branch from the output to the non-inverting input which contains a respective diode 84, 86, respectively, and an ohmic resistor 88, 90, respectively. The output of the signal integrator 16 is applied to the inverting input of the amplifier 80 and to the non-inverting input of the amplifier 82. To the non-inverting input of the amplifier 80 the reference signal from the reference signal generator 24 is directly applied, while to the inverting input of the amplifier 82 the reference signal is applied via a signal-inverting amplifier 92.

The reference signal generator 24 includes the amplifier 44 with a capacitor 48 in the feedback branch. The feedback from the output of the amplifier 44 to the inverting input via the capacitor 48 is effected alternately via one of several resistors 94, 96, 98 which can be switched into the circuit selectively for adjustment of the desired reference signal waveform and thus the peak detector sensitivity to interferences during the initial time (when the reference signal is constant). The constant voltage source 52 at the input of the amplifier 44 is constituted by a voltage divider 100 which connects to a supply voltage (not shown).

The counter 32 is a binary counter into which counting pulses are counted via a line 102. The binary counter has four stages with outputs $Q_A$, $Q_B$, $Q_C$, and $Q_D$. These counter stage outputs as well as the counter input $A_{in}$ connect to a control line 114 via AND-elements 104 106, 108, 110, 112. Via control lines 116 which are passed to the other inputs of the AND-elements 104–112, one of the AND-elements can be selectively made conducting and the respective counter output be applied to the control line 114, whereby the duration of the normal measuring intervals and thus the sensitivity of the peak detector are adjusted.

Via an OR-connection including diodes 116', 118 and 120 the outputs of the comparators 20, 22 and the control line 114 connect to a summing amplifier 122 whose output energizes the monostable flip-flop 30.

Via its output $\overline{Q}$ and a control lead 124 the monostable flip-flop 30 resets the counter 32 to zero. The other output Q of the monostable flip-flop 30 energizes the monostable flip-flops 38 and 40 via a control line 126. With its output Q the monostable flip-flop 40 controls the field effect transistor 54 bridging the capacitor 48, via an amplifier 128 and a diode 130. The monostable flip-flop 38 controls the field effect transistors 78 and 66, respectively, of the signal integrator 16 and of the integrating element 14 via an amplifier 132 and diodes 134, 136 respectively.

The pulse frequency for the counter 32 is derived from a frequency which is picked off from a quartz-controlled oscillator not shown via line 140. Reference number 142 designates a frequency divider from the "carry" output of which a correspondingly smaller pulse frequency is applied to the counter 32 via line 102. The frequency divider may also be reset by the Q output of the monostable flip-flop 30.

The signal analyzer circuit comprises two bistable flip-flops 144, 146. The bistable flip-flop 144 can be changed over by the output of the comparator 20. The bistable flip-flop 146 is energized by the output of the comparator 22 via an AND-element 148. To a second input of the AND-element 148 is connected the output $\overline{Q}$ of the bistable flip-flop 144 via a line 150. The output $\overline{Q}$ of the bistable flip-flop 146 connects to an AND-element 152. To the AND-element 152 also is connected the output Q of the bistable flip-flop 144 via a delay stage 154. The output Q of bistable flip-flop 146 on the one hand connects to a signal output Y via an inverter stage 156. On the other hand, the output Q of bistable flip-flop 146 energizes a monostable flip-flop 160 which resets the bistable flip-flop 144. This can also be effected from a control input 162 via an OR-element 161. The output of the AND-element 152 constitutes the other signal output X.

With this analyzer logic circuit the following table is obtained for the significance of the signal outputs:

| X | Y | |
|---|---|---|
| 0 | 1 | zero line |
| 1 | 1 | rise |
| 1 | 0 | drop |

The circuit may be tested to see if it accomplishes one difficult object, namely, to signal the peak end and thereupon again the peak beginning when during a single measuring interval there is an inversion of the signal change from a dropping signal to a rising signal (i.e., a saddle between two overlapping peaks).

This is attained in the following manner. With dropping signal the bistable flip-flop 144 is not set and the bistable flip-flop 146 is set. If a peak rise occurs now, an output signal will be obtained at the comparator 20. The said output signal applies a pulse to the line 85. This pulse sets the bistable flip-flop 144 and clears the bistable flip-flop 146. By the delay element 154, however, the change in state (from "1" to "0") of the bistable flip-flop 144 at the output does not yet become effective for the duration of 10 μsec. On the other hand, the clearing of the bistable flip-flop 146 (yielding a "1" at $\overline{Q}$) becomes effective immediately at the NAND-element 152 so that a pulse "0" signalling peak end appears at the inverted output of 152 for the duration of 10 μsec. Subsequently, the signal rise is immediately signalled. This momentary "0" however "tells" the signal integrator (not shown) that it should record the integrated value to this point, since what follows is actually a separate peak.

Figure 5B:
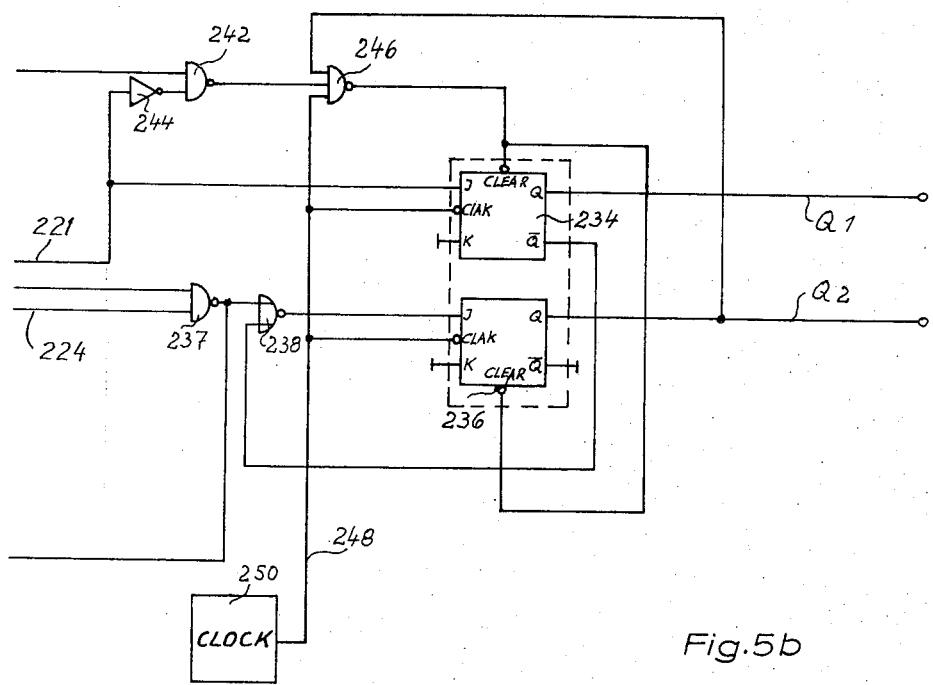
FIG. 5 (a and b) illustrates a second embodiment of the invention operating with digital components.
Figure 5A:
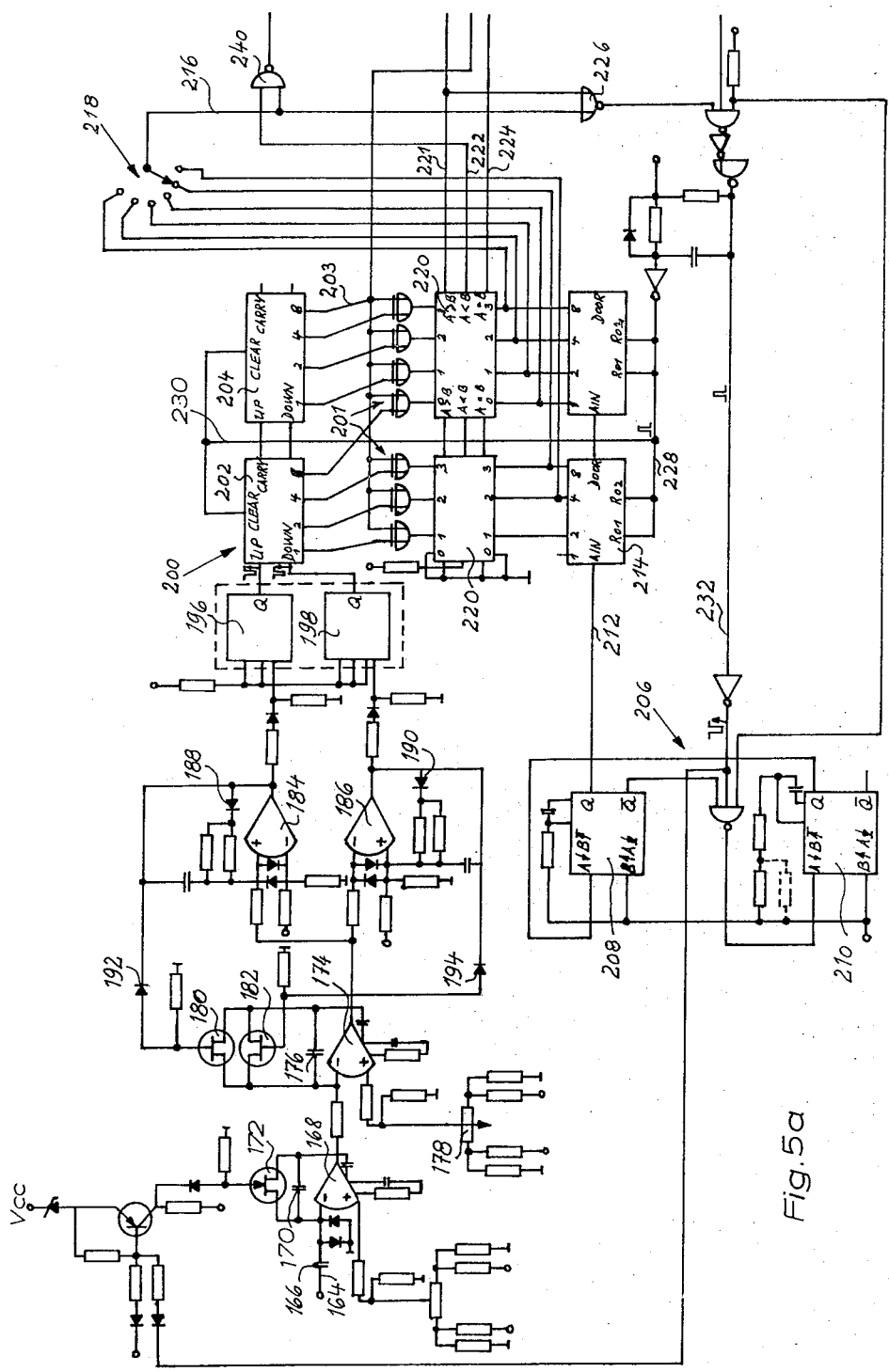

The embodied form according to FIG. 5 comprises mostly digital components. The input signal is applied to an input 164 and is differentiated by means of a capacitor 166. The differentiated input signal is integrated by a Miller-integrator comprising an amplifier 168 including a capacitor 170 in the feedback branch. The capacitor 170 is bridged by a shunting field effect transistor 172. The signal thus obtained is supplied to an integrator which is also designed as a Miller-integrator including a high-gain amplifier 174 and a capacitor 176 in the feedback branch. The capacitor is in parallel with two different field effect transistors 180, 182.

The output at the integrator 174, 176 is applied to two comparators which are constituted by two amplifiers 184, 186 including diodes 188, 190 in their feedback branch. To the amplifier 184, the integrator output is connected at the non-inverting input, while a positive reference voltage is applied to the inverting input. To amplifier 186 the integrator output is connected to the inverting input, while a negative reference voltage is applied to the non-inverting input. Thereby, one comparator is effective with positive and the other comparator with negative values of the integrator output voltage. If one of the comparators responds, thus, for instance, a positive output voltage at the integrator becomes equal to the applied reference voltage (so that comparator 184, 188 responds), then via diode 192 the field effect transistor 180 is switched on, through which capacitor 176 discharges. If, instead, the comparator including the amplifier 186 switches, then via a diode 194 the field effect transistor 182 is switched on, through which a discharge of the capaictor 176 occurs. this action is repetitive if the signal at the output of amplifier 168 is not zeroed. Depending on the polarity of the integrator output therefore pulses are obtained either at the output of the comparator 184, 188 or at the output of the comparator 186, 190. The pulse frequency is proportional to the absolute value of the voltage applied (by amplifier 168) to the integrator 174, 176 so that elements 174–194 act as a voltage-to-frequency converter. Each of the comparator amplifier (184, 186) outputs are applied to the up and down input, respectively, of a counter 200 via Schmitt-triggers 196, 198. The counter 200 is a counter having two groups of counter stages 202 and 204.

Reference numeral 206 designates a pulse generator. This pulse generator comprises two monostable flip-flops 208 and 210. The monostable flip-flop 208 is designed for a switching time of 10 microseconds, while the monostable flip-flop 210 is designed for a switch time of somewhat more than 100 milliseconds. The inverse output $\overline{Q}$ of the monostable flip-flop 208 is connected with the input A of the monostable flip-flop 210. The output Q of the monostable flip-flop 210 is connected with the input A of the monostable flip-flop 208. Once energized, this arrangement is self-oscillating. The back side of the monostable flip-flop 208 energizes the monostable flip-flop 210. The back side thereof again effects energization of the monostable flip-flop 208. Thereby, a pulse sequence of sharp pulses is obtained whose width is determined by the switching duration of the flip-flop 208 and its spacing is determined by the switching duration of the flip-flop 210. These pulses at the output Q of the monostable flip-flop 208 are counted into a counter 214 (comprising two groups of stages) via a line 212. A signal line 216 is connectable alternately to the outputs of different counter stages of the counter 214 via a selector switch 218. Counter 214 acts as the supplier of a constantly increasing digital "reference" signal. The particular output value at 218 acts to choose the constant value, after which this linearly increasing value becomes operative.

Reference numeral 220 designates a digital comparator which compares the counter reading A of the counter 200 with the counter reading B of the counter 214 and supplies an output signal at one of three outputs 221, 222, or 224, respectively, depending on whether A is greater than B, A is smaller than B or A is equal to B.

If A is greater than B, so that a signal from the output 221 occurs or else a signal occurs at the counter 214 output connected to line 216 by the selector switch 218, then an O-signal is obtained at the output of an inverting OR-element 226. By this signal via line 228 the counter 214 is reset to zero and via the line 230 the counter 200 is reset to zero. Moreover, via line 232 the oscillator 206 is energized. For the down counting in counter 200 there is provided a group of exclusive OR-elements 201 which are controlled by the counter output 203 corresponding to the highest digit of the counter 204. If a negative rise of the signal waveform occurs from the beginning of a measuring interval so that pulses are supplied to the down input of the counter 200, then the counter stages which all were in the state "0" in the initial state, are all changed to the state "1". These states must now be compared with the states of the counter 214 which exclusively counts upwardly. This is attained by the exclusive OR-elements which, if an "1" appears at the highest digit, change all digits with "1" to "0" via the lines 203. Thereby, however, a counting pulse used for the change-over gets lost. To the counter reading −1 a state corresponds at which all outputs of the exclusive OR-elements are in the state 0, while with same rise at the counter 214 a "1" signal would appear at an output. In order to take these effects into consideration, the AND-element 237 is made conducting by means of the same line 203 so that the comparator output 224 does not become effective supplying a "1" signal if $A = B$. Thus, for the negative rise this output 224 is used instead of the output 221 (A greater than B), which is used instead for setting the flip-flop 234.

The analyzer logic circuit comprises two bistable flip-flops 234 and 236. The inverted output $\overline{Q}$ of the bistable flip-flop 234 connects to the input of the bistable flip-flop 236 via an OR-element 238. The output 224 of the comparator connects to the other input of the OR-element 238 through AND gate 237, and the output 222 of the comparator 220 connects together with the control line 216 to an AND-element 240. The output of the AND-element 240 is applied to an input of another AND-element 242. To the other input of the AND-element 242 the output 221 of the comparator 220 is connected via an inverter stage 244. The output of the AND-element 242 connects to an input of AND-element 246, to whose other input the output Q of the bistable flip-flop 236 is connected. Via a line 248 the flip-flops 234 and 236 are controlled by a clock 250 which is energized each time a pulse has been counted into one of the counters 200 or 214.

The outputs $Q_1$ and $Q_2$ of the two bistable flip-flops 234 and 236 respectively supply the following information:

| $Q_1$ | $Q_2$ | |
|---|---|---|
| 0 | 0 | zero line |
| 1 | 0 | peak beginning |
| 1 | 1 | peak maximum |
| 0 | 0 | end of peak or zero line (again) |

Although the generic expression "AND" has been used to describe the logic elements, the illustrated specific embodiments actually use exclusively "NAND" type logic elements, as correclty shown in FIGS. 2 (a and b) and 5 (a and b).

We claim:
1. In a peak detector for the detection of a signal peak comprising a signal detector including a signal integrator which integrates the signal change during successive short measuring intervals and is automatically reset to zero at the end of each measuring interval, and further comprising a comparator for comparing the integrator output with a reference quantity, by having applied thereto the output of the signal integrator, the improvement comprising:
   the means for generating said reference quantity is of such construction that said reference quantity remains at a constant non-zero value during an initial portion of each measuring interval and then rises with time during the remaining part of each measuring interval.
2. A peak detector as claimed in claim 1, in which:

a differentiating means differentiates the input signal;

an integrating stage integrates the output of said differentiating means before the thus differentiated and integrated input signal is supplied to said integrator for integrating said signal during successive short measuring intervals;
   and resetting means reset said integrating stage and said integrator to zero at the beginning of each measuring interval.
3. A peak detector as claimed in claim 1, in which:

said reference quantity generating means is of such further construction that said rise of the reference quantity takes place linearly from the non-zero level of said constant initial portion.
4. A peak detector as claimed in claim 3, in which:

said reference quantity generating means comprises a Miller-integrator including an amplifier of high gain, the output of which is fed back via an ohmic resistor and a capacitor in series to the input, that to the input of the amplifier a constant voltage is applied, and that the capacitor is shunted by a circuit element which is energized during the initial portion of each measuring interval.
5. A peak detector as claimed in claim 4, further comprising:
   a counter, to which counting pulses at a fixed rate are supplied by a pulse generator, for the determination of the measuring interval length; and a monostable flip-flop energized by said counter after a given pulse number which, on the one hand, energizes said circuit element in said reference quantity generating means and, on the other hand, resets said signal integrator and said counter to zero.

6. A peak detector as claimed in claim 5, in which:

said monostable flip-flop is also energizable by the output of the comparator in addition to by the counter output,
whereby said reference quantity generating means and said signal integrator are reset when the integrated input signal exceeds said reference quantity.

7. A peak detector as claimed in claim 1, in which:

the comparator comprises a first and second comparator means;
each of said comparator means is constituted by a difference amplifier including an inverting and a non-inverting input and a feedback branch from the output to the noninverting input having in series an ohmic resistor and a diode in blocking direction;
the first comparator means having supplied the integrator output to its inverting input and the analog reference quantity to its non-inverting input;
the second comparator means having supplied the integrator output to its non-inverting input, and the reference signal is inverted and then supplied to its inverting input.

8. A peak detector as claimed in claim 1, in which:

the signal integrator comprises a voltage-to-frequency converter including a first counter to which the output pulses thereof are applied;
a second counter is provided into which a fixed frequency is counted by a pulse generator, the contents of said second counter being the reference quantity;
and the comparator receives and compares the counter readings of the first and of the second counter digitally.

* * * * *